3,261,827
ORGANIC FIBER REACTIVE DYESTUFFS

Carl Boresch and Roderich Raue, Leverkusen, Germany, assignors to Farbenfabriken Bayer Aktiengesellschaft, Leverkusen, Germany, a corporation of Germany
No Drawing. Filed Mar. 5, 1962, Ser. No. 177,161
Claims priority, application Germany, Mar. 7, 1961, F 33,361
7 Claims. (Cl. 260—163)

The present invention relates to novel dyestuffs; more particularly it relates to dyestuffs of the formula

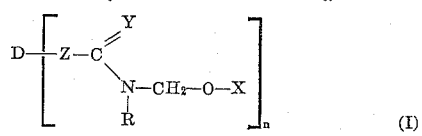

In this formula D stands for the radical of an organic dyestuff, Z means a direct bond or a bridge member, Y stands for O, S or NH, R represents hydrogen or a substituent, X stands for the residue of an aliphatic, aromatic or hydroaromatic carboxylic acid, and $n$ is a whole number.

Compounds of the formula

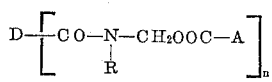

wherein D is the radical of a dyestuff selected from the class consisting of monoazo, disazo, anthraquinone and polymethine dyestuff moieties, R is a member selected from the group consisting of hydrogen and lower alkyl, A is lower alkyl, and $n$ is an integer of 1–2, are particularly noted in this regard.

It is an object of this invention to provide novel and valuable dyestuffs. Another object is to provide so-called fibre-reactive dyestuffs which are able to undergo chemical linkage with OH group containing fibrous materials or with NH group containing fibrous materials. Still another object is the provision of dyeings and prints with the novel dyestuffs on hydroxyl group containing materials, especially textile materials of native or regenerated cellulose, which colorings are outstandingly fast to wet processing, such as to washing. It is also an object of the invention to provide fibre-reactive dyestuffs which in contrast to hitherto known reactive dyestuffs can be applied and chemically fixed on cellulose materials under acid conditions. Further objects will appear from the following description.

The novel dyestuffs are generally obtainable by introducing at least one grouping of the general formula

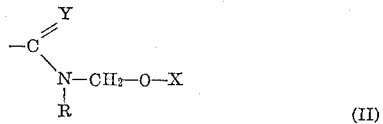

wherein Y, X and R have the aforesaid significance into dyestuffs or preliminary dyestuff products, and, in the case preliminary dyestuff products are used, transforming the latter into the desired final dyestuffs by known methods.

The dyestuffs into which at least one grouping of the Formula II is introduced can belong to a great variety of classes. There are to be mentioned, for example, azo, azomethine, polymethine dyestuffs, anthraquinone dyestuffs as well as their substitution and condensation products, oxazine and dioxazine, azine, thiazine, indigo, quinophthalone, acridine, thiazole, xanthene, nitro and nitroso dyestuffs, triphenyl methane dyestuffs as well as polycyclic more highly condensed dyestuff systems of the benzanthrone and dibenzanthrone series and their condensation products. If these dyestuffs contain metal complex-forming groupings, for example in the series of the mono- or polyazo and azomethine compounds, it is often advantageous to use the dyestuffs in the form of their metal complex compounds such as copper, cobalt, chromium, iron and nickel complexes, or to metallise them subsequently on the fibre. Among the azaporphin dyestuffs the phthalocyanine dyestuffs are of special interest because they are comparatively easily obtainable. These can be employed as metal-free compounds and also as compounds containing metals in complex union, for example as cobalt, copper and nickel phthalocyanine.

The above mentioned groupings of Formula II are introduced into the dyestuffs by suitable methods of preparation, for example by transforming dyestuffs containing at least one amide or amidine group of the formula

wherein Y and R have the above meaning, with formaldehyde or formaldehyde-yielding agents into the corresponding N-methylol compounds and esterifying these with aromatic, aliphatic or hydroaromatic carboxylic acids. According to the type of the starting components used the grouping (II) can either be linked directly with the basic dyestuff molecule

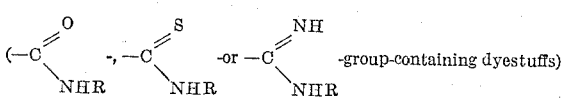

or via any desired bridge member, for example, via alkylene, ether, thioether, secondary or tertiary amino groups, aminoalkylene, amide, amidoalkylene and similar groups. The substituent R can also be a constituent of a hetero ring, in which the grouping

can also be included as in derivatives of a 5-pyrazolone unsubstituted in the 1-position, or of barbituric acid. If R stands for hydrogen, two groupings —CH$_2$OX may be introduced at the carboxamide nitrogen.

The reaction of the dyestuffs containing amide or amidine groups with formaldehyde or formaldehyde-yielding agents is generally carried out in an aqueous or aqueous-organic medium at temperatures from 20–100° C. The subsequent esterification can be carried out according to known methods.

A special method of carrying out the process for the production of the new dyestuffs consists in reacting dyestuffs containing at least one grouping (III) in glacial acetic acid with paraformaldehyde or other formaldehyde-yielding agents, preferably at temperatures from 70–100° C. Since the grouping

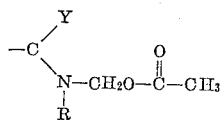

is hereby introduced in one operation this procedure proves of special advantage in many cases. The process can also take place in such a way that the starting compounds are first treated with paraformaldehyde or other formaldehyde-yielding agents in glacial acetic acid and subsequently with acetic anhydride.

The reaction of dyestuffs or preliminary dyestuff products containing at least one group of the Formula III with a reaction product of paraformaldehyde, glacial acetic acid and water can, in some cases, be carried out on the fibre, whereby the carboxamide groups, etc., are transformed into groupings of Formula II. In case of using preliminary dyestuff products these can be transformed on the fibre into the desired final dyestuffs, for example, by the reaction of diazo salt solutions with such coupling components deposited on the fibre, which contain at least one grouping (II). In the last mentioned reactions on the fibre the formation of groupings (II) and the fixation of these groups on the fibre is carried out in one single operation.

The groupings of Formula II can be introduced into the basic dyestuffs as well as into the preliminary dyestuff products according to the above mentioned or modified processes. In the case of the substitution of the above mentioned radicals into preliminary dyestuff products, this is followed by one of the customary transformation reactions to give the final products. Examples for this are inter alia the coupling of diazo compounds with coupling components when at least one of the starting components should contain one of the groups (II).

The dyestuffs and preliminary dyestuff products can be substituted in the usual manner, for example, by acid groups such as sulphonic acid, carboxylic acid and similar groupings, further by cyano, nitro, halogeno, optionally substituted alkyl, alkoxy, aralkyl or aryl radicals, alkylamino, aralkylamino, arylamino, acylamino, sulphone groups and the like, furthermore by reactive groups such as halotriazinylamino or -amido groups, halopyrimidinylamino or -amido groups, esterified oxalkylamino or -amido groups, haloalkylamino or haloacylamino groups, vinylsulphone, sulphofluoride, esterified oxalkylsulphone, acrolyamino groups which may be substituted by alkyl or halogen, urethane, isothiocyanate and epoxide groups or the like. The final dyestuffs contain, according to definition, at least one grouping of Formula II. Dependent on the type of starting components used they may contain several of such groups. Water-soluble dyestuffs are preferably produced.

The new dyestuffs are outstandingly suitable for the dyeing or printing of material such as filaments, fibres, foils, ribbons and the like, especially of textile materials of a great variety, for example such of native or regenerated cellulose, cellulose esters, natural and synthetic polyamides and polyurethanes. The water-soluble dyestuffs are preferably used for the dyeing of fabrics of cellulose, wool, silk and synthetic polyamides.

Cellulose textile materials can be dyed in such a way that dyestuffs containing one or more groupings of the Formula II are dissolved in the desired concentration in a weakly acid, preferably organic acid medium, for example, in an acetic acid or formic acid medium, the fabric is then foularded with the aqueous solutions and subsequently fixed at an elevated temperature, for example within the range of 100–160° C. For printing, emulsion thickenings are used, which consist, for example, of hydrocarbons, an emulsifier such as ethoxylated Lorol, and an acid component such as tartaric acid or acetic acid. Acid-resistant thickening agents also, such as starch ether, may be used for printing.

Other materials such as textile materials of wool, silk, synthetic polyamide and polyurethane fibres are dyed according to customary techniques, preferably from an acid bath, or printed in the usual manner. On cellulose, natural and synthetic polyamide and synthetic polyurethane fibres dyeings and prints of very good fastness properties, especially excellent fastness to wet processing, are obtained.

Dyestuffs containing methylol groups have already been described repeatedly (cf., for example, German patent specification 1,079,756 and Belgian patent specification 568,725). As compared with these dyestuffs, the dyestuffs obtainable according to the present invention are distinguished by their application to textiles, for example cotton and regenerated cellulose, by an increased strength of shade and a better bath stability.

A large number of so-called reactive dyestuffs too, are known from publications. As was pointed out again recently in an article by H. Zollinger, "Chemismus der Reaktivfarbstoffe," Angewandte Chemie, February 1961, pages 125 to 136, an essential precondition for the application of such dyestuffs to cellulose materials consists in that the cellulose is subjected to the chemical process of fixation in the form of its alkali metal salts or in an anionic form.

Surprisingly, the new dyestuffs of the present invention can be fixed from an acid medium, i.e., under conditions under which, according to evidence, the cellulose cannot develop an anionic form. This result contradicts the existing knowledge of the reaction chemism of so-called and hitherto known reactive dyestuffs on cellulose.

The acid fixation of the novel dyestuffs onto OH-group containing textiles offers some further advantages. Inter alia it enables conventional highly active finishing agents to be simultaneously used in the dye bath.

The following examples are given for the purpose of illustrating the invention without, however, limiting it thereto; the parts therein are parts by weight:

*Example 1*

5 parts of the dyestuff p-sulphanilic acid→1-phenyl-5-pyrazolone-3-carboxylic acid amide are heated to 80–85° C. for 40 minutes with 1.5 parts of paraformaldehyde and 15 parts of glacial acetic acid whereby solution is effected. 5 parts of acetic anhydride are then added and the mixture is reacted at 80° C. for a further 10 minutes. After cooling the reaction mixture, the solution is filtered and evaporated in a vacuum at 40° C.

30 parts of the dyestuff thus obtained and having the

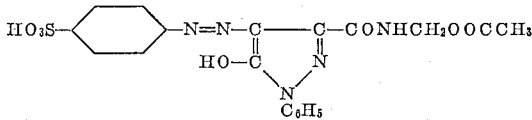

are dissolved in 1000 parts of aqueous acetic acid. A cotton fabric is impregnated with this solution, padded on the foulard (squeezing effect 70%) and fixed at 140° C. for 15 minutes. After rinsing and boiling with soap the fabric is dyed in a brilliant yellow with outstanding fastness to light and wet processing.

*Example 2*

10 parts of the dyestuff p-sulphanilic acid→3-methyl-5-pyrazolone are reacted at 90° C. for 90 minutes with 2 parts of paraformaldehyde and 20 parts of glacial acetic acid whereby solution is effected. After cooling, the mixture is filtered off with suction, and the filtrate containing the dyestuff of the formula

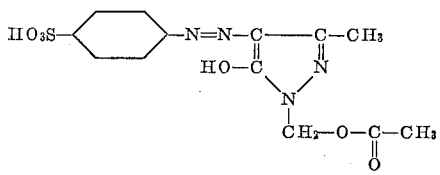

is diluted with water to a bath concentration of 30 g. dyestuff per litre.

A cotton fabric is dyed with this solution as described in Example 1. A greenish yellow dyeing outstandingly fast to wet processing is obtained.

*Example 3*

40 parts of the sodium salt of 2-sulpho-4-diethylaminobenzaldehyde and 12.1 parts cyanacetamide are heated to 50° C. with 200 parts of alcohol and 4 parts of piperidine are added. The reaction mixture is heated to the boil, whereby the dyestuff crystallises. After boiling under reflux for 4 hours the alcohol is distilled off in a vacuum, the residue is dissolved in 250 parts of water, clarified with active charcoal and filtered off with suction after cooling.

5 parts of the dyestuff thus produced are reacted as described in Example 1. The solution obtained contains the dyestuff

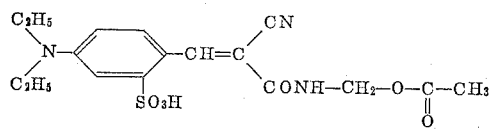

After filtration, the solution is diluted with water to a concentration of 30 g. dyestuff per litre, and subsequently fixed on cellulose as described in Example 2. A yellow dyeing is obtained with very good wet fastness properties.

Example 4

30 parts of the dyestuff p-sulphanilic acid→1-phenyl-5-pyrazolone-3-carboxylic acid amide are dissolved at 90–100° C. in 80 parts of a solution obtained by reacting 15 parts of paraformaldehyde, 90 parts of glacial acetic acid, 10 parts of water at 80–90° C., and made up with water to 1 litre.

If the dyestuff thus obtained is dyed according to the data given in Example 2, a dyeing is obtained with properties equal to those of the dyestuff in Example 1.

Example 5

30 parts of the dyestuff obtained in conventional manner from 1 - amino-4-bromo-anthraquinone-2-sulphonic acid and 4-aminobenzoic acid amide, are dissolved in 1000 parts of water, and 80 parts of a reaction product of paraformaldehyde, water and glacial acetic acid are added. The dyestuff of the formula

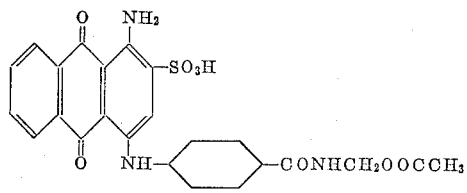

is thus obtained. If cotton is dyed with a solution of this dyestuff according to the instructions of Example 2, a clear blue dyeing of outstanding fastness is obtained.

Example 6

5 parts of 1-phenyl-5-pyrazolone - 3 - carboxylic acid amide are hot dissolved in 100 parts of glacial acetic acid, the solution treated with 1 part of paraformaldehyde and the condensation reaction carried out at 80 to 90° C. within 30 minutes. The clear solution is then cooled down to 10° C. and coupled with an ice-cold solution of an equimolecular amount of diazotised p-sulfanilic acid while adding a solution of 3 parts of sodium acetate in 7 parts of water. After completion of the coupling the solution of the dyestuff thus obtained and corresponding to the formula

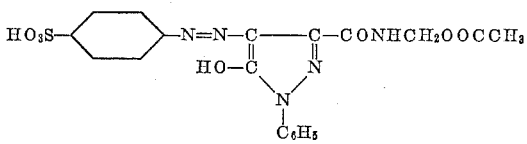

is diluted to a concentration of 50 g. of dyestuff per litre of water. A cotton fabric is dyed with this solution according to the method given in Example 1. One obtains a reddish yellow dyeing being excellent fast to wet processes.

Example 7

5 parts of the monoazo dyestuff 4-aminobenzene carboxylic acid amide→1 - (4' - sulfophenyl) - 3 - methyl-5-pyrazolone are condensed at 90° C. within one hour with 2 parts of paraformaldehyde and 50 parts of propionic acid. The solution of the dyestuff formed is diluted with water until a concentration of 40 g. of dyestuff per litre of water is reached. Cotton fabrics can be dyed with this soltuion as indicated in Example 1, clear reddish yellow shades thus being obtainable which exhibit excellent fastness to wet processing.

Example 8

5 parts of the dyestuff 4-aminobenzoic acid amide→1-hydroxy-8-acetylamino-naphthalene - 3,6 - disulfonic acid are reacted within one hour at 90° C. with 2 parts of paraformaldehyde and 50 parts of propionic acid. The dyestuff solution thus obtained is filtered, diluted to a concentration of 30 g. of dyestuff per litre of water and applied onto a cotton fabric according to the method given in Example 1. A bluish red dyeing of good fastness to wet processing is thus obtained.

If in this example as starting components 4-aminobenzoic acid amide and 1-hydroxy-6-benzoylamino-naphthalene-3-sulfonic acid are used, a dyestuff is obtained which yields on cotton and regenerated cellulose yellowish red dyeings. With the dyestuff prepared from diazotised 4-aminobenzene sulfonic acid and 2,3- hydroxynaphthoic acid amide and reacted with paraformaldehyde and propionic acid yellowish red shades are obtained on cotton which exhibit excellent fastness to wet processing.

Example 9

5 parts of the dyestuff from diazotised 4-aminobenzene carboxylic acid amide and 1-(4'-sulfophenyl)-3-methyl-5-pyrazolone are condensed at 80 to 90° C. within one hour with 2 parts of paraformaldehyde and 50 parts of glacial acetic acid. The solution of the dyestuff thus obtained is diluted to a concentration of 30 g. of dyestuff per litre of water and applied onto cotton as indicated in Example 1. One obtains a yellow dyestuff which exhibits excellent fastness to wet processing.

If in this example the initial dyestuff is replaced by the corresponding monoazo dyestuff obtained by using 4-aminobenzoic acid methylamide as diazo compound a fibre-reactive dyestuff is obtainable which produces on cotton greenish yellow shades of good fastness to wet processing.

If using in this example as initial azo dyestuffs those obtained from the following starting components, fibre-reactive dyestuffs are produced which yield on cotton fast shades as indicated below:

| Diazo component | Coupling component | Shade on cotton |
| --- | --- | --- |
| 4,4'-diaminodibenzyl-2,2'-disulfonic acid. | 1-phenyl-5-pyrazolone-3-carboxylic acid amide. | Reddish yellow. |
| 4-aminobenzoic acid amide | 1-hydroxy-6-aminonaphthalene-3-sulfonic acid. | Yellowish scarlet. |
| Do | 2-hydroxynaphthalene-6-sulfonic acid. | Reddish orange. |
| Do | 1-hydroxy-8-acetylamino-naphthalene-3,6-disulfonic acid. | Red. |
| Do | 1-hydroxy-6-benzoylamino-naphthalene-3-sulfonic acid. | Yellowish red. |
| p-Sulfanilic acid | 2,3-hydroxynaphthoic acid amide. | Red. |
| 2-aminobenzoic acid amide | 1-(2'-sulfophenyl)-3-phenyl-5-pyrazolone. | Reddish yellow. |

Example 10

5 parts of the polymethine dyestuff obtained from equimolecular amounts of 1,3,3-trimethyl-2-methyleneindoline-5-sulfonic acid and 1-phenyl-4-dimethylaminomethylene-pyrazolone-3-carboxylic acid amide are condensed according to the method given in Example 9 with paraformaldehyde in glacial acetic acid. The dyestuff thus obtained corresponds to the formula

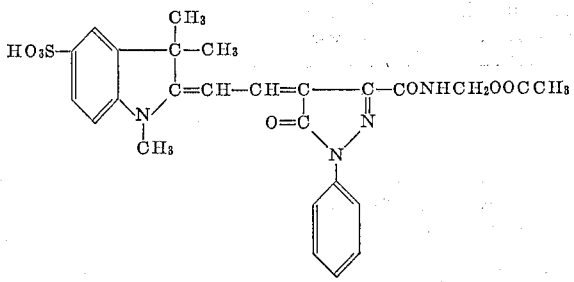

Its solution is diluted to a dyestuff concentration of about 4 to 5 percent and then applied onto cotton similar to the method indicated in Example 1. One obtains yellowish orange shades of good fastness to wet processing.

Example 11

5 parts of the azo dyestuff 2-sulfanilic acid→2,3-hydroxynaphthoic acid amide are reacted at 80 C. within one hour with 2 parts of paraformaldehyde and 60 parts of 80 percent acetic acid whereupon the components completely dissolve. The solution cooled down is filtered and the filtrate diluted with water to a concentration of 30 g. of dyestuff per litre of water. The dyestuff solution can be applied on cotton and regenerated cellulose according to the prescription given in Example 1, reddish orange shades of excellent wet fastness properties thus being obtained.

Example 12

5 parts of the 2:1-chromium complex dyestuff 1-amino-2 - hydroxybenzene-4-sulfonic acid→1-phenyl-5-pyrazolone-3-carboxylic acid amide are condensed wtih 1.5 parts of paraformaldehyde in 30 parts glacial acetic acid at 90° C. within 45 minutes. The dyestuff solution thus obtained is diluted with water to get a dyestuff concentration of 4 percent and then dyed on cotton fabric as indicated in Example 1. A dull somewhat bluish red dyeing is thus obtainable which exhibits very good fastness to wet processing.

If instead of the initial dyestuff used in this example the 2:1-chromium complex compound of the monoazo dyestuff from the same diazo component and 2,3-hydroxynaphthoic acid amide is employed, a dyestuff is obtained which, when diluted to a concentration of 4 to 5 percent, dyes cotton violet shades of excellent wet fastness properties.

If using as initial dyestuff 5 parts of the 2:1-chromium complex of the monoazo dyestuff obtained from diazotised 4-nitro-2-aminophenol-6-sulfonic acid and 1-phenyl-5-pyrazolone-3-carboxylic acid amide, a fibre-reactive dyestuff is obtained which dyes cotton yellowish brown shades very fast to wet processing.

Example 13

5 parts of 1-amino-4-(3'-ureidophenyl)-amino-anthraquinone-2-sulfonic acid are reacted at 80° C. within one hour with 7 parts of paraformaldehyde and 50 parts of glacial acetic acid whereupon the components completely dissolve. After this time one obtains in solution the dyestuff which in the free acid state corresponds to the

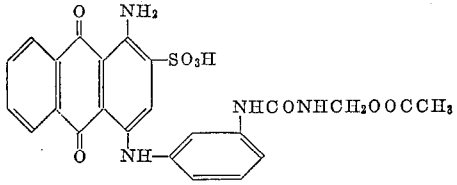

formula which as a 3 percent aqueous solution can be dyed on cotton yielding blue shades of very good wet fastness properties.

If in this example the azo dyestuff obtained from diazotised 3-aminophenylurea→1-(4'-sulfophenyl)-3-methyl-5-pyrazolone is used as initial dyestuff and the condensation otherwise carried out as indicated above, a dyestuff is obtained which dyes cotton goods reddish yellow shades of excellent fastness to wet processing. The dyed materials surprisingly exhibit very good creaseproof properties.

Example 14

5 parts of 1-amino-4-phenylamino-2-sulfonic acid-2'-carbonamide are condensed at 75 to 80° C. within one hour with 3 parts of paraformaldehyde and 50 parts of 80 percent acetic acid. The resulting solution contains the dyestuff of the formula

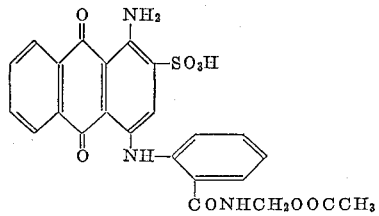

which may be applied onto cotton according to the procedure given in Example 1, reddish blue shades of good fastness to wet processing thus being obtainable.

Example 15

5 parts of the monoazo dyestuff 1-amino-3-ureidobenzene→1-(2'-sulfophenyl)-3-methyl-5-pyrazolone are reacted with 2 parts of paraformaldehyde and 30 parts of glacial acetic acid at 80° C. within 45 minutes. The dyestuff thus obtainable is diluted to a concentration of 5 percent and then dyed onto cotton as indicated in Example 1, reddish yellow shades of excellent wet fastness properties thus being obtainable. The dyeing further distinguishes itself by very good creaseproof effect.

If using as initial dyestuff the monoazo dyestuff obtained from diazotised 3-aminophenylurea and 1-(4',8'-disulfonaphthyl-[2])-3-methyl-5-pyrazolone, a fibre-reactive dyestuff can be obtained which yields on cotton greenish yellow shades of excellent fastness properties.

Example 16

5 parts of the 2:1-chromium complex compound of the monoazo dyestuff 6-nitro-2-amino-1-hydroxybenzene-4-sulfonic acid→1-phenyl-5-pyrazolone-3-carboxylic acid amide are condensed with 2 parts of paraformaldehyde and 30 parts of glacial acetic acid at 90° C. within one hour, a dyestuff thus obtainable dyes cotton bluish red shades of good fastness properties.

We claim:
1. A dyestuff of the formula

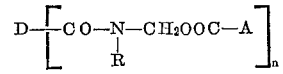

wherein D is the radical of a dyestuff selected from the class consisting of monoazo, disazo, anthraquinone and polymethine dyestuff moieties; R is a member selected from the group consisting of hydrogen and lower alkyl; A is lower alkyl; and $n$ is an integer of 1–2.

2. A dyestuff of claim 1 wherein D stands for a water-soluble disazo dyestuff.

3. A dyestuff of claim 1 wherein D stands for a water-soluble anthraquinone dyestuff.

4. A dyestuff of the formula $$D-CONHCH_2OOCR_2$$

wherein D stands for a water-soluble anthraquinone dyestuff and $R_2$ stands for a member taken from the class consisting of $CH_3$ and $C_2H_5$.

5. A dyestuff of the formula

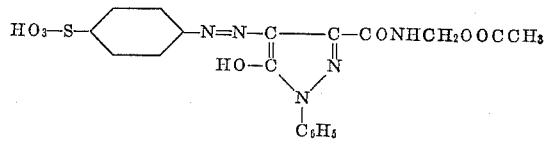

6. A dyestuff of the formula

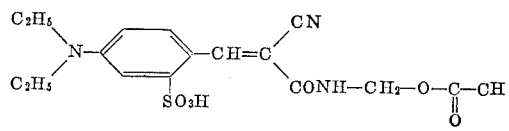

7. A dyestuff of the formula

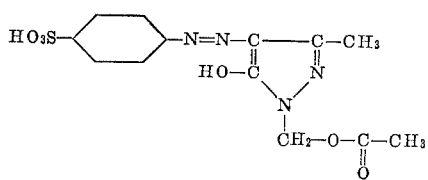

References Cited by the Examiner

UNITED STATES PATENTS

| | | | |
|---|---|---|---|
| 2,038,298 | 4/1936 | Kiernan et al. | 260—163 |
| 2,045,324 | 6/1936 | Felix et al. | 260—207.1 |
| 2,128,256 | 8/1938 | Krzikalla et al. | 260—156 X |
| 2,330,828 | 10/1943 | Lubowe et al. | 260—163 |
| 3,073,662 | 1/1963 | Jaeger et al. | 8—54.2 |
| 3,084,016 | 4/1963 | Dawson et al. | 8—54.2 |
| 3,114,754 | 12/1963 | Lodge et al. | 260—199 X |
| 3,123,595 | 3/1964 | Brugger et al. | 260—198 X |

CHARLES B. PARKER, *Primary Examiner.*

LEON V. ZITNER, JOSEPH P. BRUST, *Examiners.*

R. J. FINNEGAN, D. M. PAPUGA, *Assistant Examiners.*